United States Patent
Kwak et al.

(10) Patent No.: US 12,517,185 B2
(45) Date of Patent: Jan. 6, 2026

(54) METHOD FOR DETECTING ABNORMAL CONDITION OR FAULT OF BATTERY, AND A BATTERY MANAGEMENT SYSTEM OPERATING THE SAME

(71) Applicants: SK Innovation Co., Ltd., Seoul (KR); SK On Co., Ltd., Seoul (KR)

(72) Inventors: Ju Eun Kwak, Daejeon (KR); Kyung Min Song, Daejeon (KR); Ky Sang Kwon, Daejeon (KR)

(73) Assignees: SK INNOVATION CO., LTD., Seoul (KR); SK ON CO., LTD., Seoul (KR)

( * ) Notice: Subject to any disclaimer, the term of this patent is extended or adjusted under 35 U.S.C. 154(b) by 148 days.

(21) Appl. No.: 18/188,941

(22) Filed: Mar. 23, 2023

(65) Prior Publication Data
US 2023/0384392 A1  Nov. 30, 2023

(30) Foreign Application Priority Data
May 31, 2022  (KR) .......................... 10-2022-0066885

(51) Int. Cl.
*G01R 31/392* (2019.01)
*G01R 31/367* (2019.01)
*G01R 31/3835* (2019.01)
*G01R 31/396* (2019.01)
(Continued)

(52) U.S. Cl.
CPC ......... *G01R 31/392* (2019.01); *G01R 31/367* (2019.01); *G01R 31/3835* (2019.01); *G01R 31/396* (2019.01); *G06N 3/08* (2013.01); *H02J 7/0048* (2020.01); *H02J 7/005* (2020.01)

(58) Field of Classification Search
CPC ............... G01R 31/392; G01R 31/367; G01R 31/3835; G01R 31/396; G01R 19/10; G01R 19/16528; G01R 19/16571; G01R 31/3646; G01R 31/3648; G01R 31/3842; G06N 3/08; G06N 3/0455; G06N 3/0464; H02J 7/0048; H02J 7/005; H02J 7/00;
(Continued)

(56) References Cited

U.S. PATENT DOCUMENTS

| 10,901,046 | B2 * | 1/2021 | Kishi ................... H01M 10/48 |
| 12,095,056 | B2 | 9/2024 | Kim et al. |
| 2006/0181245 | A1 | 8/2006 | Mizuno et al. |

(Continued)

FOREIGN PATENT DOCUMENTS

| KR | 10-2017-0051059 A | 5/2017 |
| KR | 10-2252178 B1 | 5/2021 |

(Continued)

*Primary Examiner* — Akm Zakaria
(74) *Attorney, Agent, or Firm* — Perkins Coie LLP

(57) ABSTRACT

A method for detecting an abnormal fault of a battery, includes measuring cell data from battery cells included in a battery pack for a predetermined period of time; generating two-dimensional input data by mapping the cell data on a two-dimensional plane having a first axis corresponding to the period of time and a second axis corresponding to an index of each of the battery cells; inputting the two-dimensional input data into an abnormal fault detection model pre-trained to detect the abnormal fault in the battery; and determining whether an abnormal cell, having entered an abnormal state, among the battery cells, is present, based on an output of the abnormal fault detection model.

17 Claims, 12 Drawing Sheets

(51) Int. Cl.
*G06N 3/08* (2023.01)
*H02J 7/00* (2006.01)

(58) Field of Classification Search
CPC ..... H02J 7/00032; H02J 7/0047; B60L 58/16; H01M 10/486
See application file for complete search history.

(56) References Cited

U.S. PATENT DOCUMENTS

| | | | |
|---|---|---|---|
| 2017/0126027 A1 | 5/2017 | Park | |
| 2019/0242950 A1* | 8/2019 | Kishi | H01M 10/42 |
| 2020/0355749 A1 | 11/2020 | Takahashi et al. | |
| 2022/0077514 A1* | 3/2022 | Kim | H01M 10/482 |
| 2022/0196754 A1* | 6/2022 | Kim | G01R 31/3842 |
| 2023/0098846 A1* | 3/2023 | Pathipati | B60L 53/122 |
| | | | 320/108 |
| 2023/0108798 A1* | 4/2023 | Shim | G01R 31/388 |
| | | | 324/433 |
| 2023/0152388 A1* | 5/2023 | Sung | G01R 31/392 |
| | | | 701/33.6 |
| 2023/0347785 A1* | 11/2023 | Niu | B60L 58/21 |
| 2023/0377035 A1* | 11/2023 | Kang | B60L 58/12 |
| 2024/0006670 A1* | 1/2024 | Lim | G01R 31/392 |
| 2024/0255581 A1* | 8/2024 | Fan | G01R 31/367 |
| 2024/0319015 A1* | 9/2024 | Jayakumar | B60L 3/0046 |

FOREIGN PATENT DOCUMENTS

| | | |
|---|---|---|
| KR | 10-2022-0032471 A | 3/2022 |
| WO | 2019-138286 A1 | 7/2019 |

* cited by examiner

| CELL ID | T1 | T2 | T3 | T4 | T5 | ... | TM |
|---|---|---|---|---|---|---|---|
| 1 | 0 | 0 | 0.1 | 0.2 | 0.2 | ... | 0.2 |
| 2 | 0 | 0 | 0.1 | 0 | 0.1 | ... | 0.2 |
| 3 | 0 | 0 | 0.1 | 0.2 | 0 | ... | 0.2 |
| 4 | 0 | 0 | 0.1 | 0.2 | 0.1 | ... | 0.2 |
| 5 | 0 | 0.2 | 0.1 | 0.1 | 0.2 | ... | 0.2 |
| ⋮ | ⋮ | ⋮ | ⋮ | ⋮ | ⋮ | ⋮ | ⋮ |
| N | 0 | 0 | 0.1 | 0.2 | 0.3 | ... | 0.1 |

FIG. 6

METHOD FOR DETECTING ABNORMAL CONDITION OR FAULT OF BATTERY, AND A BATTERY MANAGEMENT SYSTEM OPERATING THE SAME

CROSS-REFERENCE TO RELATED APPLICATION(S)

This application claims the benefit of priority to Korean Patent Application No. 10-2022-0066885 filed on May 31, 2022 in the Korean Intellectual Property Office, the disclosure of which is incorporated herein by reference in its entirety.

TECHNICAL FIELD

The present disclosure relates to a method for detecting an abnormal condition or fault of a battery, and a battery management system using the same.

BACKGROUND

A battery pack connected as part of an electrical power source for an electric vehicle, an energy storage device, or the like, may include at least one battery module, and one battery module may include a plurality of battery cells. A battery management system connected to the battery pack may collect various pieces of data for managing/monitoring the battery from its battery modules or battery cells.

SUMMARY

A battery management system can be configured, based on the various pieces of data collected, to determine whether an abnormal fault has occurred in the battery. In order to operate and manage the battery in a stable manner, it may be necessary, desirable or advantageous to quickly and accurately detect an abnormal fault in the battery. The disclosed technology in this patent document can be implemented in a battery management system for managing and/or operating various batteries including, e.g., rechargeable secondary batteries.

An aspect of the present disclosure is to provide a method for detecting an abnormal fault of a battery, capable of stably operating and managing the battery by quickly detecting the abnormal fault of the battery, based on measurement data such as electrical voltage (also referred to as the cell voltage), electric current (also referred to as the cell current), temperature, or the like that may be measured from the battery, usage data on the battery, and system characteristics of an electric vehicle, an energy storage device, or the like, equipped with the battery, and a battery management system using the same.

According to another aspect of the present disclosure, a method for detecting an abnormal fault of a battery, includes measuring cell data from battery cells included in a battery pack for a predetermined period of time; generating two-dimensional input data by mapping the cell data on a two-dimensional plane having a first axis corresponding to the period of time and a second axis corresponding to an index of each of the battery cells; inputting the two-dimensional input data into an abnormal fault detection model pre-trained to detect the abnormal fault in the battery; and determining whether an abnormal cell, having entered an abnormal state, among the battery cells, is present, based on an output of the abnormal fault detection model.

According to yet another aspect of the present disclosure, a battery management system includes an input data generator configured to receive cell data from at least a portion of a plurality of battery cells for a predetermined period of time, and map the cell data on a two-dimensional plane, to generate two-dimensional input data; an abnormal fault detection model configured to identify at least one battery cell having a deviation of the cell data outside of a normal range, among the plurality of battery cells, based on the two-dimensional input data; and an abnormal fault determiner determining whether the at least one battery cell is an abnormal cell.

According to yet another aspect of the present disclosure, a method for managing a battery, executed in a system including a battery management system and a server connected to the battery management system through a communication network, includes receiving cell data collected from the battery by the battery management system for a predetermined period of time, by the server; generating two-dimensional input data by mapping the cell data on a two-dimensional plane having a first axis corresponding to the period of time and a second axis corresponding to an index of respective battery cells included in the battery, by the server; inputting the two-dimensional input data into an abnormal fault detection model pre-trained to detect an abnormal fault in the battery and stored in the server; determining whether an abnormal cell, having entered an abnormal state, among the battery cells, is present, based on an output of the abnormal fault detection model; and transmitting information on the abnormal cell to a user terminal connected to the network, the battery management system, or both the user terminal and the battery management system, by the server.

BRIEF DESCRIPTION OF DRAWINGS

The above and other aspects, features, and advantages of the present disclosure will be more clearly understood from the following detailed description, taken in conjunction with the accompanying drawings, in which:

FIG. 6 is a diagram illustrating cell data collected in a method for detecting an abnormal fault of a battery, according to an embodiment.

DETAILED DESCRIPTION

Various features of the disclosed embodiments, and methods of achieving the same, and certain advantages associated with specific implementations are described below with reference to the detailed description set forth below in conjunction with the accompanying drawings.

Figure 1A:
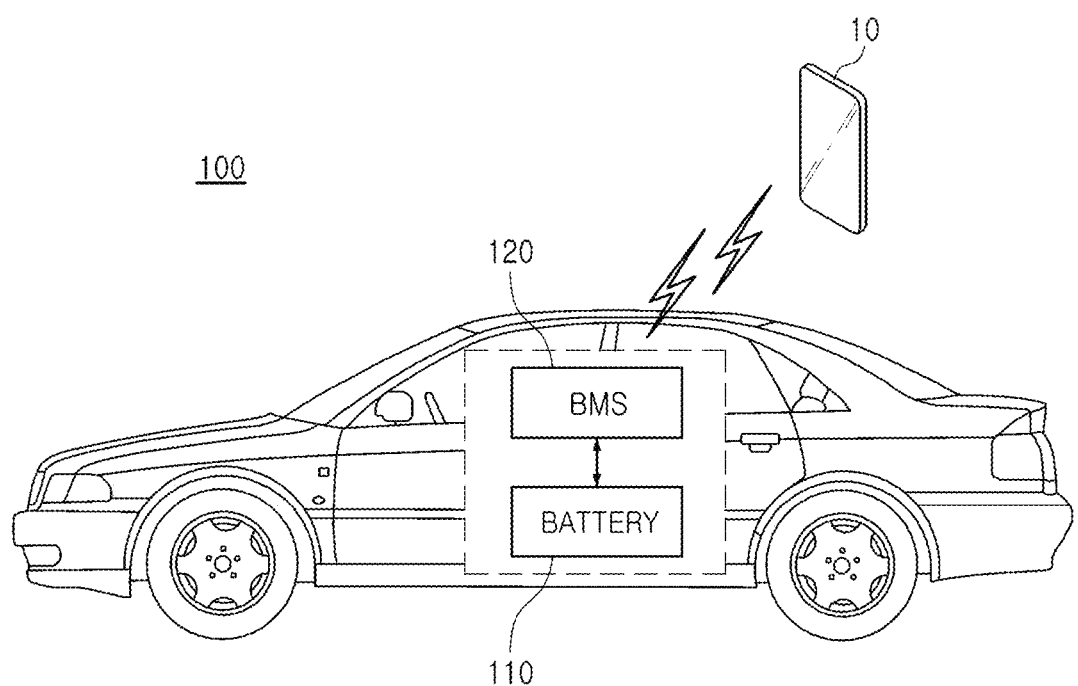
FIG. 1A is a diagram illustrating an electric vehicle equipped with a battery management system according to an embodiment.

FIG. 1A is a diagram illustrating an electric vehicle equipped with a battery management system according to an embodiment.

Referring to FIG. 1A, an electric vehicle 100 may include a battery 110 and a battery management system 120. The battery management system 120 may be referred to as a battery management system (BMS), and may control the charging and the discharging of the battery 110. In addition, the battery management system 120 may monitor a state-of-charge, a remaining lifespan, or the like, of the battery 110, and may output the state-of-charge, the remaining lifespan, or the like, to an owner or a driver of the electric vehicle 100, on a display in the electric vehicle 100 and/or a user terminal 10 that interfaces with the electric vehicle 100, or the like.

The battery 110 may be implemented as a battery pack having a plurality of battery modules, and each of the plurality of battery modules may include a plurality of battery cells. For example, each of the plurality of battery cells may include a case, a positive electrode, a negative electrode, an electrolyte solution, and a separator that is disposed between the positive electrode and the negative electrode in the case. When the battery 110 is a rechargeable lithium ion battery, in a charging operation, lithium ions emitted from the positive electrode may be moved and concentrated on the negative electrode through the separator, and in a discharging operation, lithium ions emitted from the negative electrode may be moved and concentrated on the positive electrode through the separator.

Due to the electric vehicle 100 being powered by an output of the battery 110, and usually having a driver, a passenger, or the like, on board the electric vehicle 100, stably operating the battery 110 and monitoring a condition thereof may be required or desirable. For example, when an abnormal cell condition occurs among the plurality of battery cells included in the battery 110, it is necessary to quickly detect the occurrence and notify the driver, the passenger, or the like, riding in the electric vehicle 100 when it is in motion, or to an owner of the electric vehicle 100 when it is stopped.

In an embodiment illustrated in FIG. 1A, an abnormal fault detection model, which includes a machine learning model, may be mounted in the battery management system 120. The battery management system 120 may collect cell data from sensors connected to the battery 110, and may input the same to a pre-trained abnormal fault detection model, to determine whether an abnormal fault has occurred in the battery 110. For example, the battery management system 120 may collect cell data from sensors connected to a plurality of battery cells included in the battery 110, to determine whether an abnormal fault has occurred in one or more of the plurality of battery cells. Since the abnormal fault detection model is mounted in the battery management system 120, an abnormal fault detection service by the battery management system 120 may operate in a stand-alone manner.

For example, a sensor connected to the battery 110 may measure a cell voltage, a cell current, a temperature, or the like, from a plurality of battery cells. The battery management system 120 may receive data measured by the sensor at predetermined time intervals, and may acquire a difference between the data measured by the sensor according to the time interval, as cell data. Therefore, the cell data may include a difference in cell voltage, a difference in cell current, a difference in temperature, or a combination thereof, measured by the sensor at predetermined time intervals.

The battery management system 120 may transform the cell data into a predetermined format, and input the same to the abnormal fault detection model. For example, the abnormal fault detection model may include a convolutional neural network (CNN) model optimized for processing and classification of an image. In this case, the battery management system 120 may generate two-dimensional input data by mapping the cell data on a two-dimensional plane, and may input the two-dimensional input data to the abnormal fault detection model. The abnormal fault detection model may be trained by a training data set including, as input data, cell data collected from a plurality of battery cells while an abnormal state does not occur.

Figure 1B:
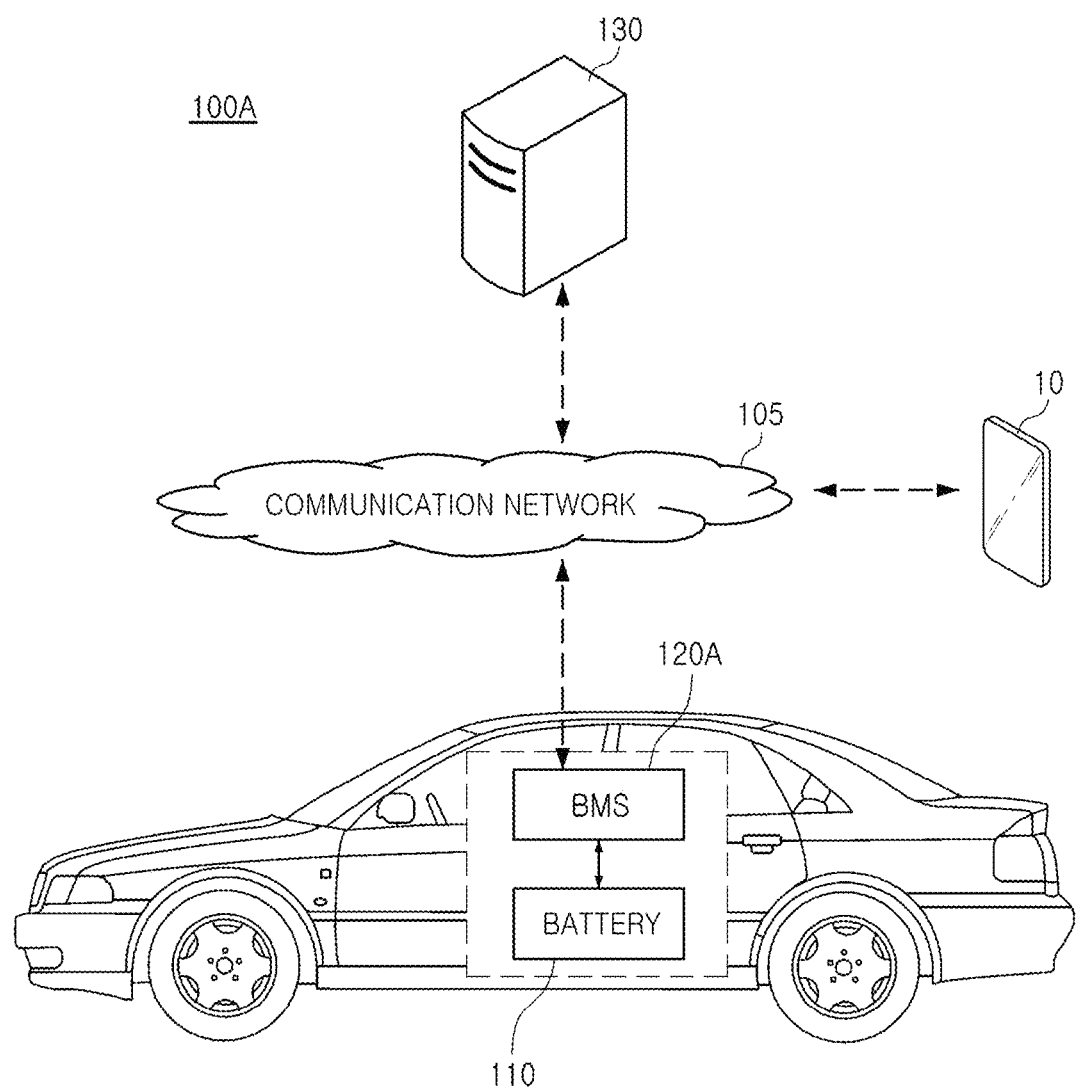
FIG. 1B is a diagram illustrating a system in which a method for detecting an abnormal fault of a battery, according to an embodiment, is performed.

FIG. 1B is a diagram illustrating a system in which a method for detecting an abnormal fault of a battery, according to an embodiment, is performed.

Referring to FIG. 1B, a system 100A according to an embodiment may include a battery management system 120A for managing a battery 110, a server 130, and the like. The battery management system 120A and the server 130 may be communicatively connected to each other through a communication network 105. A user terminal 10 owned by a user of an electric vehicle, equipped with the battery 110 and the battery management system 120A, may also be connected to the communication network 105, for example.

The battery management system 120A may collect cell data necessary for charging and discharging the battery 110 and monitoring a state-of-charge, a remaining lifespan, or the like of the battery 110. The battery 110 may be implemented as a battery pack having a plurality of battery modules, and each of the plurality of battery modules may include a plurality of battery cells.

As described above, in an electric vehicle being powered by an output of the battery 110 and with a person on board, stably operating the battery 110 and monitoring a condition of the battery 110 may be required and desirable. For example, when an abnormal cell exists among the plurality of battery cells included in the battery 110, it is necessary to quickly detect an occurrence and notify a driver, a passenger, or the like, riding in an electric vehicle when it is in motion, or to an owner of the electric vehicle when it is stopped.

In an embodiment illustrated in FIG. 1B, an abnormal fault detection model that includes a machine learning model may be implemented in the server 130, rather than in the battery management system 120A. The battery management system 120A may collect cell data from sensors connected to the battery 110, and may transmit the collected cell data to the server 130 through the communication network 105. As described above, the battery management system 120A may collect a cell voltage, a cell current, a temperature, or the like, as the cell data using the sensors connected to the battery cells.

The server 130 may receive the cell data, collected by the battery management system 120A for a predetermined period of time, from the battery 110 through the communication network 105. The server 130 may process the cell data to generate two-dimensional input data, which may be input to the abnormal fault detection model. For example, the server 130 may generate two-dimensional input data by mapping the cell data on a two-dimensional plane having a first axis corresponding to a period of time and a second axis corresponding to indices of battery cells included in the battery 110, and may input the two-dimensional input data into the abnormal fault detection model.

The server 130 may determine information on an abnormal cell among the plurality of battery cells, based on an output of the abnormal fault detection model, and may transmit the information on the abnormal cell externally through the communication network 105. For example, the server 130 may transmit the information of the abnormal cell to the electric vehicle through the communication network 105, or to the user terminal 10 of the owner of the electric vehicle. Matching information between the electric vehicle and the user terminal 10 may be previously stored in the server 130.

In an embodiment illustrated in FIG. 1B, the server 130 may be connected to a plurality of electric vehicles through the communication network 105. The server 130 may define a plurality of groups by classifying the plurality of electric vehicles according to production years, cumulative mileages, or average mileages of the plurality of electric vehicles, a lifespan state of a battery installed in each of the plurality of electric vehicles, or a combination thereof.

The server 130 may receive cell data from electric vehicles included in each of the plurality of groups, and may use the same to provide a maintenance notification service. For example, the server 130 may notify an owner of an electric vehicle in need of maintenance, among the electric vehicles, or the like, of a maintenance time. For example, voltage deviations measured in the battery cells may be received as cell data, from each of the electric vehicles belonging to a first group in which production years thereof is equal to or less than three (3). The server 130 may comparing voltage deviations received from the electric vehicles belonging to the first group with each other, to determine a representative value of the voltage deviations. For example, the representative value may be a median value or an average value.

The server 130 may set a reference range based on the representative value, and may notify the owner of the electric vehicle that has transmitted voltage deviations outside of the reference range, among electric vehicles belonging to the first group, of occurrence of a maintenance reason. For example, the reference range may be defined as a remaining range, other than the lowest 25% range and the highest 25% range, in distribution of voltage deviations received from the electric vehicles belonging to the first group. In this case, a maintenance notification service may be provided for an electric vehicle whose cell data belongs to the lowest 25% range or the highest 25% range in the distribution of voltage deviations that were transmitted to the server 130.

In this manner, the electric vehicles connected to the server 130 may be classified into a plurality of groups, and, based on cell data of electric vehicles belonging to each of the plurality of groups, electric vehicles having excessively large or small cell data may be notified of occurrence of a maintenance reason in advance, to improve stability of the electric vehicles.

Figure 2:
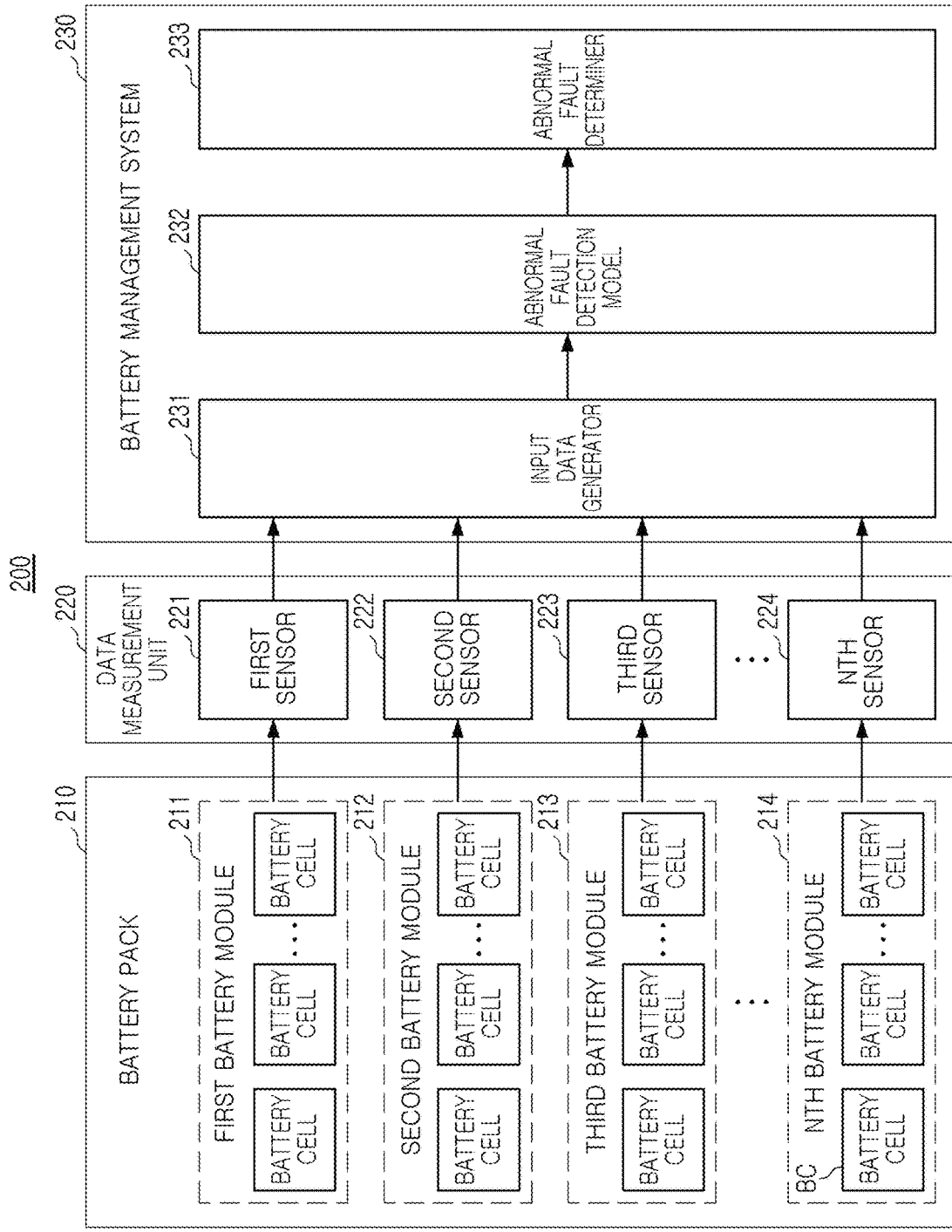
FIGS. 2 and 3 are block diagrams illustrating battery systems including a battery management system according to an embodiment.
Figure 3:
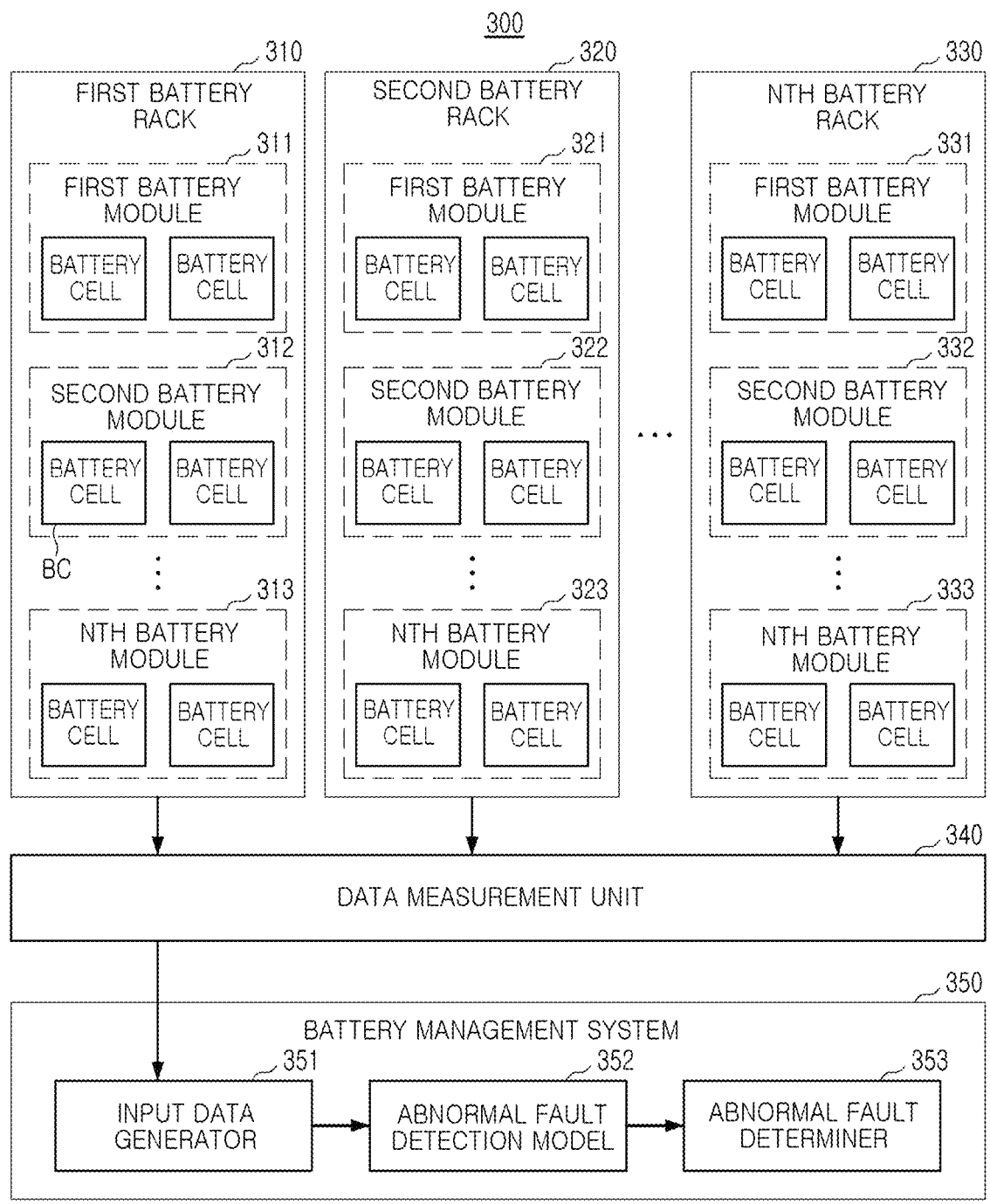

FIGS. 2 and 3 are block diagrams illustrating battery systems including a battery management system according to an embodiment.

According to an embodiment, and referring to FIG. 2, a battery system 200 may be mounted in an electric vehicle as a power source. The battery system 200 may include a battery pack 210 including a plurality of battery modules 211 to 214, a data measurement unit 220 including a plurality of sensors 221 to 224, a battery management system 230, and the like.

Each of the plurality of battery modules 211 to 214 may include a plurality of battery cells BC. Each of the plurality of battery cells BC may have the same structure as described above, and one of the sensors 221 to 224 included in the data measurement unit 220 may be connected to each of the plurality of battery cells BC. For example, the sensors 221 to 224 included in the data measurement unit 220 may measure a cell voltage, a cell current, a temperature, or a combination thereof of each of the plurality of battery cells BC, as cell data. In the embodiment illustrated in FIG. 2, the battery system 200 mounted on the electric vehicle includes one battery pack 210, but the battery system 200 may include two or more battery packs 210.

The battery management system 230 may include, among other modules, an input data generator 231, an abnormal fault detection model 232, an abnormal fault determiner 233. The input data generator 231 may generate input data, which may be input to the abnormal fault detection model 232, using cell data measured at predetermined time intervals by the sensors 221 to 224 of the data measurement unit 220.

For example, the abnormal fault detection model 232 may be trained to output whether an abnormal cell is present among the plurality of battery cells BC, using a two-dimensional image, and in this case, the input data generator 231 may map the cell data on a two-dimensional plane, to generate two-dimensional input data. In an embodiment, the two-dimensional input data is defined in a two-dimensional plane having a first axis corresponding to a period of time in which the sensors 221 to 224 measure the cell data from the plurality of battery cells BC, and a second axis corresponding to indices of the plurality of battery cells BC.

The abnormal fault detection model 232 may include a plurality of models. For example, a first abnormal fault detection model may receive the two-dimensional input data output by the input data generator 231, and may output only a data deviation of the cell data actually measured in the plurality of battery cells BC, but not communication errors/ noises that may occur during charging and/or driving of the electric vehicle, errors of the sensors 221 to 224, or the like. The data deviation output by the first abnormal fault detection model may be an abnormal data deviation, outside of a normal range.

The abnormal fault detection model 232 may further include a second abnormal fault detection model using an output of the first abnormal fault detection model to determine whether at least one abnormal condition or fault occurs among the sensors 221 to 224, whether at least one abnormal cell among the plurality of battery cells BC is present, or the like. The second abnormal fault detection model may generate a distribution of data deviations output by the first abnormal fault detection model according to a state-of-charge (SOC) that each of the plurality of battery cells BC may have. For example, the second abnormal fault detection model may determine whether an abnormal cell actually entered an abnormal state is present among the plurality of battery cells BC, based on a distribution of data deviations indicated in a predetermined SOC section.

The abnormal fault determiner 233 may receive information from the abnormal fault detection model 232 with respect to identification of at least one battery cell having a data deviation outside of the normal range and process the information to determine whether the at least one battery cell exhibits an abnormal state. The abnormal fault determiner 233 may specify a cell in which an abnormal state or condition has occurred, among the plurality of battery cells BC, based on an output of the abnormal fault detection model 232, and may output a signal indicating the detected abnormal state or condition of the cell. A cell with a detected abnormal state or condition may be referred to as an abnormal cell. For example, the abnormal fault determiner 233 may notify an occurrence of the abnormal state in one or more of the plurality of battery cells BC, e.g., with a warning sound or by a display of the electric vehicle in which the battery system 200 is mounted.

The abnormal fault determiner 233 may specify and output an indication of an abnormal cell that has entered an abnormal state among the plurality of battery cells BC, a battery module including the abnormal cell, or the like, with reference to the output of the abnormal fault detection model 232. Therefore, an owner of the electric vehicle may visit a repair shop or the like, and may quickly solve a problem of the battery system 200.

According to an embodiment, a temperature of each of the plurality of battery modules 211 to 214 may be sensed in charging the battery pack 210. In this case, the abnormal fault detection model may further include a third abnormal fault detection model determining whether an abnormal cell occurs in each of the plurality of battery modules 211 to 214, which are being charged, according to a change in temperature measured by the plurality of sensors 221 to 224, respectively. The abnormal fault determiner 233 may determine whether an abnormal cell exists, with reference to the output of the third abnormal fault detection model, during charging of the electric vehicle.

While an electric vehicle is being charged, the electric vehicle may not be in motion. Therefore, when it is determined that an abnormal cell occurs during charging of the electric vehicle with reference to the output of the third abnormal fault detection model, the abnormal fault determiner 233 may notify the owner of the electric vehicle of the abnormal cell, e.g., through their smartphone using the communication network. Alternatively, occurrence of the abnormal cell may be output through the display of the electric vehicle. In either case, the notification is provided before charging of the electric vehicle is finished and the driving starts.

The input data generator 231, the abnormal fault detection model 232, and the abnormal fault determiner 233, included in the battery management system 230, may be implemented as a software module, respectively. When each component included in the battery management system 230 is implemented as a software module, the software module may be stored in a readable recording medium that may be read and executed by a computer. For example, a software module corresponding to each of the input data generator 231, the abnormal fault detection model 232, and the abnormal fault determiner 233 may be stored in a storage device mounted in the electric vehicle.

Next, referring to FIG. 3, a battery system 300 according to an embodiment may be employed in an energy storage device. The battery system 300 may include a plurality of battery racks 310 to 330 respectively including a plurality of battery modules 311 to 313, 321 to 323, and 331 to 333, a data measurement unit 340 including a plurality of sensors, and a battery management system 350, and the like. According to an embodiment, a separate data measurement unit 340 and a separate battery management system 350 may be provided in each of the plurality of battery racks 310 to 330.

Each of the plurality of battery modules 311 to 313, 321 to 323, and 331 to 333 may include a plurality of battery cells BC. A structure of each of the plurality of battery cells BC may be similar to that described above.

The data measurement unit 340 may be connected to the plurality of battery cells BC to collect cell voltages, cell currents, temperatures, or the like of the plurality of battery cells BC as cell data. The cell data collected by the data measurement unit 340 may be transmitted to an input data generator 351 of the battery management system 350. Similar to that described above with reference to FIG. 2, the input data generator 351 may generate two-dimensional input data by mapping cell data on a predefined two-dimensional plane, and output the same to an abnormal fault detection model 352.

The abnormal fault detection model 352 may include a first abnormal fault detection model that may recognize and process the two-dimensional input data as an image, to then determine a data deviation such as a cell voltage, a cell current, or the like, as a function of time. In addition, a second abnormal fault detection model may determine whether an abnormal cell, having entered an abnormal state is present using the data deviation, to then determine whether a sensor in which an error occurs, among the sensors included in the data measurement unit 340, is present.

The abnormal fault determiner 353 may output an index of an abnormal cell, a type of abnormal state, or the like, based on data output by the abnormal fault detection model 352. For example, the abnormal fault determiner 353 may output the index of the abnormal cell, the type of abnormal state, or the like, through a display and/or an audio output unit provided in an energy storage device in which the battery system 300 is mounted. Alternatively, whether an abnormal cell exists, or the like, may be output through a computer device connected to the energy storage device, to manage and operate the energy storage device.

In embodiments described with reference to FIGS. 2 and 3, the battery management system 230 in which the abnormal detection model 232 is connected to the battery pack 210, and the battery management system 350 in which the abnormal detection model 352 is connected to the plurality of battery racks 310 to 330 may be performed in a stand-alone manner. As described above with reference to FIG. 1B, the abnormal fault detection model may be stored in an external server connected to the battery management systems 230 and 350 through the communication network, and the abnormal fault detection model may operate in the server.

In this case, a first abnormal fault detection model receives the two-dimensional input data and outputs the data deviation of the cell data, and a second abnormal fault detection model determines whether the abnormal fault occurs in a sensor connected to the battery cells and/or whether an abnormal cell is present, based on an output of the first abnormal fault detection model may be stored and performed in the server. The server may determine whether an abnormal cell exists, whether a sensor has an error, or the like, based on an output of the first abnormal fault detection model and an output of the second abnormal fault detection model, respectively, and may transmit the same to a user through the communication network.

Figure 4:
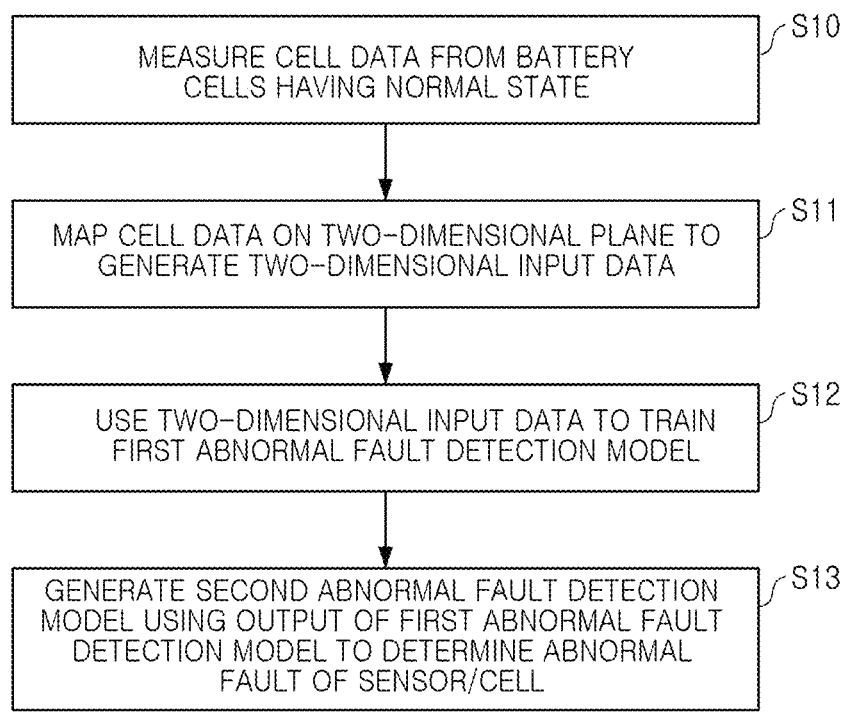
FIGS. 4 and 5 are flowcharts illustrating a method for detecting an abnormal fault in a battery, according to an embodiment.

FIG. 4 is a flowchart illustrating a method for detecting an abnormal fault in a battery, according to an embodiment.

Referring to FIG. 4, a method for training an abnormal fault detection model may start by measuring cell data from battery cells having a normal state (S10). For example, the cell data measured from the battery cells having a normal state may be a cell voltage, a cell current, or the like.

The cell data may be collected during a predetermined time interval and may be collected periodically. For example, during a first period of time, cell data required for training may be generated by measuring a cell voltage, a cell current, or the like from the battery cells according to a first time interval. The time interval for measuring the cell voltage, the cell current, or the like from the battery cells may be constant or fixed.

When cell data is measured, the cell data may be mapped on a two-dimensional plane to generate two-dimensional input data (S11). The two-dimensional plane may have a first axis and a second axis, corresponding to predetermined variables. For example, the first axis may correspond to a time interval in which a cell voltage, a cell current, or the like is measured, and the second axis may correspond to an index, which may be identification information of a plurality of battery cells, in which the cell voltage, the cell current, or the like is measured.

Cell data such as a cell voltage, a cell current, or the like may be mapped on respective coordinates of the two-dimensional plane defined by the first axis and the second axis. For example, an absolute value of cell data measured by each of the plurality of battery cells for each time interval may be mapped to each of the coordinates. Alternatively, a difference between a previous value of cell data measured at a previous time and a current value of cell data measured at a current time may be mapped on each of the coordinates.

The two-dimensional input data may be image data expressed on the two-dimensional plane. In this case, the cell data mapped to each of the coordinates may correspond to pixel data of respective pixels of the image data. In an embodiment, since the pixel data included in the two-dimensional input data may be changed according to the cell data mapped to each of the coordinates, the two-dimensional input data may be differently generated according to cell data collected from the plurality of battery cells.

When the two-dimensional input data is generated, a first abnormal fault detection model may be trained using the generated data (S12). To prevent overfitting and underfitting of the first abnormal fault detection model, a plurality of pieces of two-dimensional input data may be generated with cell data collected from battery cells operating in a normal state under various conditions, and the same may be used as a training data set for training. For example, the overfitting in which an error for an actual data increase may occur, when the first abnormal fault detection model is overtrained by the training data set. According to an embodiment, cell data collected from battery cells that have entered an abnormal state may be generated as two-dimensional input data, and the same may be included in the training data set. For example, the first abnormal fault detection model may include a convolutional neural network model that processes the two-dimensional input data that may be image data, to output whether each of the battery cells enters the abnormal state.

When the training of the first abnormal fault detection model is completed, a second abnormal fault detection model may be generated using an output of the first abnormal fault detection model to determine an error of a sensor that collects cell data, whether each of the battery cells enters an abnormal state, or the like (S13). For example, in an abnormal cell entering an abnormal state, among the battery cells, a cell voltage deviation and/or a cell current deviation may be large in a specific SOC section, due to a change in resistance. The second abnormal fault detection model may use the above characteristics, to determine whether an abnormal cell is present by using a correlation between a cell voltage/cell current measured in each of the plurality of battery cells and a cell voltage/cell current measured in respective remaining battery cells.

Each of operations S10 to S13 may be performed by any entity according to a method of implementing the detection of an abnormal fault in a battery. For example, when an abnormal fault detection model for implementing the method for detecting an abnormal fault in a battery is mounted in a battery management system and operates in a stand-alone manner, as in an embodiment described with reference to FIG. 1A, each of S10 to S13 is performed by a battery management system mounted on an electric vehicle or an energy storage device. As described with reference to FIG. 1B, when an abnormal fault detection model is mounted and performed on a separate server, S10 may be performed by the battery management system, and S11 to S13 may be performed by the server.

Figure 5:
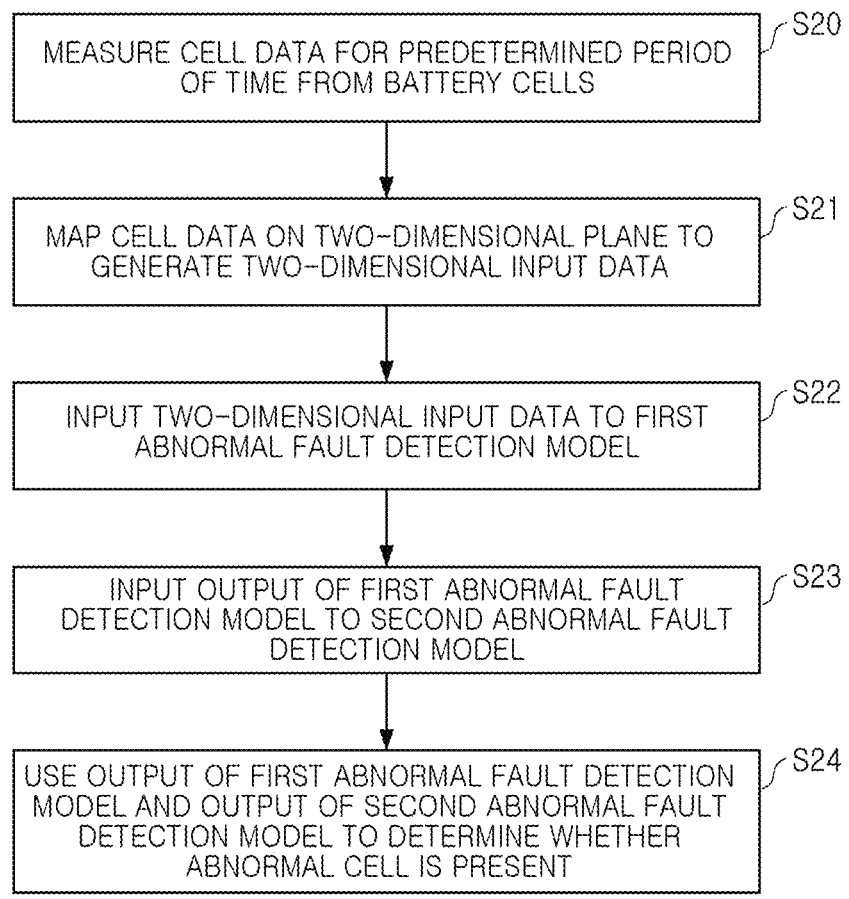

FIG. 5 is a flowchart illustrating a method for detecting an abnormal fault in a battery, according to an embodiment.

Referring to FIG. 5, a method for detecting an abnormal fault in a battery, according to an embodiment, may start by measuring cell data for a predetermined period of time from battery cells such as a battery pack mounted in an electric vehicle, a battery rack mounted in an energy storage device, or the like (S20). As described above, during a preset period of time, sensors connected to the battery cells at predetermined time intervals may measure the cell data such as a cell voltage, a cell current, a temperature, or the like. For example, the sensors may measure the cell voltage, the cell current, or the like as the cell data while the battery is in use, and may measure the temperature as the cell data while the battery is charged.

A battery management system may map the cell data collected in S20 on a two-dimensional plane to generate two-dimensional input data (S21). For example, the two-dimensional plane to which the cell data is mapped in S21 may be identical to the two-dimensional plane defined for generating the training data set in the training of the abnormal fault detection model, described above with reference to FIG. 4.

The two-dimensional input data may be input to a first abnormal fault detection model (S22). As described above with reference to FIG. 4, the first abnormal fault detection model may be a machine learning model trained to receive two-dimensional input data having an image data format and detect a data deviation, for example, a cell voltage deviation or a cell current deviation, appearing in a plurality of battery cells.

An output of the first abnormal fault detection model may be input to a second abnormal fault detection model (S23). The second abnormal fault detection model may be a model using the data deviation output from the first abnormal fault detection model, to determine whether errors in sensors connected to the plurality of battery cells are present, and/or whether abnormal cells that have entered an abnormal state among the plurality of battery cells are present, or the like. For example, the second abnormal fault detection model may use a correlation between data deviations of each of the plurality of battery cells, to determine whether errors in sensors are present, and/or whether abnormal cells are present, or the like.

An output of the first abnormal fault detection model and an output of the second abnormal fault detection model may be used to determine whether an abnormal cell is present, and the same may be used to notify a manager of an electric vehicle, an energy storage device, or the like, equipped with a battery system (S24). For example, as described above with reference to FIGS. 2 and 3, an abnormal fault determiner included in a battery management system may notify a manager of an electric vehicle, an energy storage device, or the like, of an index, which may be identification information of the battery cell or the like, determined as an abnormal cell, with reference to the output of the first abnormal fault detection model and the output of the second abnormal fault detection model.

FIG. 6 is a diagram illustrating cell data collected in a method for detecting an abnormal fault of a battery, according to an embodiment.

In a method for detecting an abnormal fault of a battery, according to an embodiment, a cell voltage, a cell current, or the like may be measured in a plurality of battery cells, respectively, at predetermined time intervals as cell data. In addition, a cell voltage deviation, a cell current deviation, or the like, indicating a change amount of the cell voltage, the cell current, or the like, measured from each of the plurality of battery cells may be measured as cell data for each time interval.

In an embodiment, cell data may be organized as a table, as illustrated in FIG. 6. In an embodiment illustrated in FIG. 6, cell voltages from the plurality of battery cells are measured as cell data at every M time points, and the number of the plurality of battery cells to be measured is N.

At a first time point T1 at which a cell voltage is measured for the first time, cell data may be measured as 0 in all battery cells. The above may not mean that a cell voltage measured in each of the N battery cells is 0V, and may mean that a difference in cell voltage is not calculated, because there is no other cell voltage measured before the first time point T1. For example, the cell voltage measured at the first time point T1 may be set as a reference voltage.

Referring to FIG. 6, a deviation of a cell voltage in a fifth battery cell during a time interval between the first time point T1 and a second time point T2 may be 0.2V. In addition, a deviation of a cell voltage in most battery cells during a time interval between the second time point T2 and a third time point T3 may be 0.1V. For example, a time interval between adjacent time points T1-TM may be 1 second, but the time interval may be set to other values according to different embodiments.

As described above, in an embodiment, cell data such as a cell voltage, a cell current, a temperature, or the like may be collected at predetermined time intervals for a predetermined period of time from each of the plurality of battery cells. In addition, differences in cell data collected for each time interval, for example, a cell voltage deviation, a cell current deviation, or the like may be calculated. Therefore, tabulated raw data, as illustrated in FIG. 6, may be obtained.

As described above, in an embodiment, to determine whether an abnormal cell that has entered an abnormal state, among the plurality of battery cells, is present, an abnormal fault detection model that includes a machine learning model may be used. For example, the abnormal fault detection model may include a convolutional neural network model specialized for image processing/classification, and according to an embodiment, a CNN autoencoder (CNN-AE) model in which the convolutional neural network model is combined with an auto-encoder may be used. Therefore, as illustrated in FIG. 6, a data pre-processing operation for converting the tabulated raw data into two-dimensional image data may be required. Hereinafter, it will be described with reference to FIGS. 7 and 8.

Figure 7:
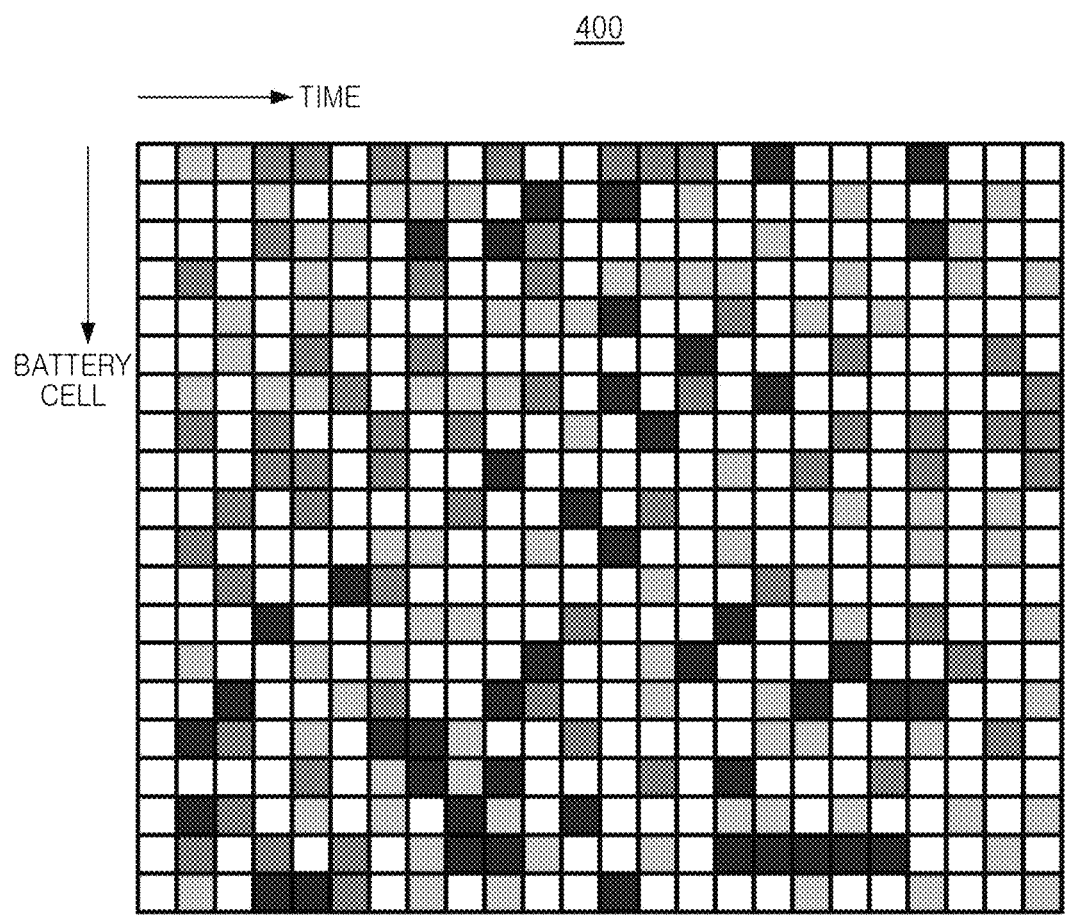
FIGS. 7 and 8 are diagrams illustrating two-dimensional input data generated in a method for detecting an abnormal fault of a battery according to an embodiment.
Figure 8:
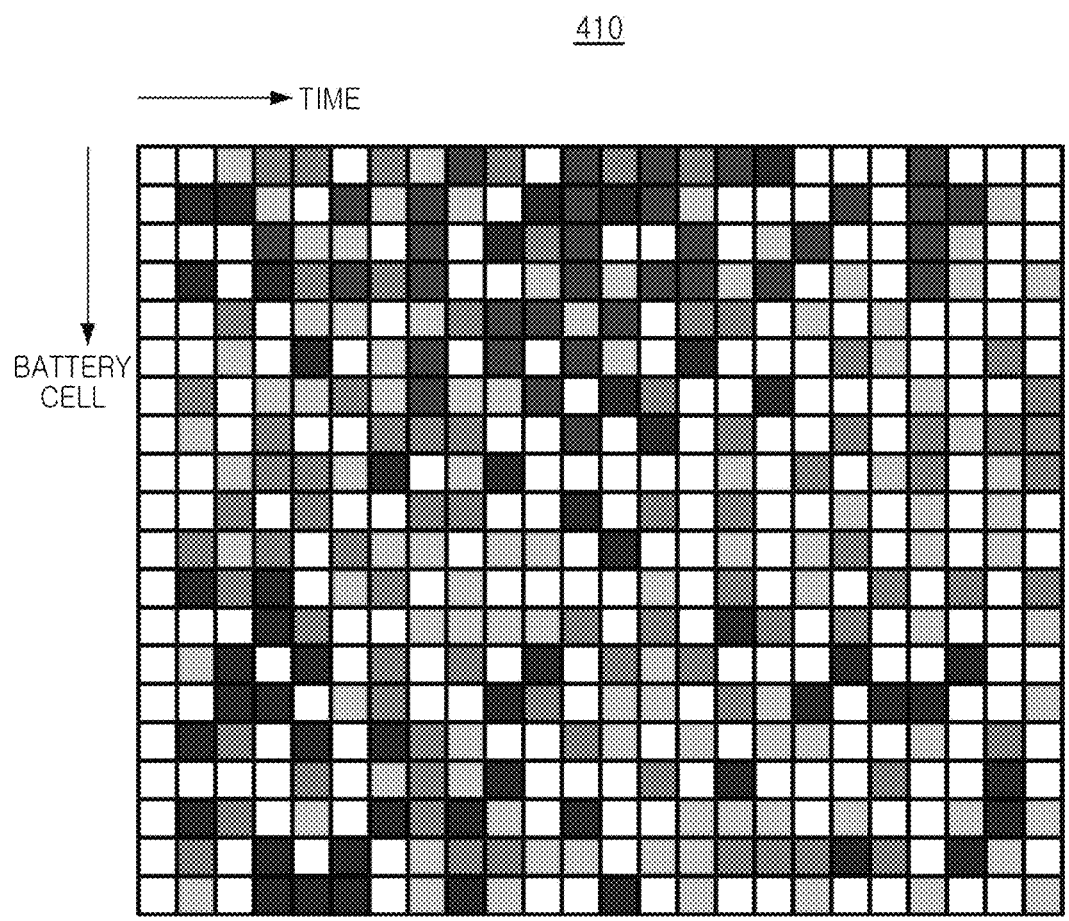

FIGS. 7 and 8 are diagrams illustrating two-dimensional input data generated in a method for detecting an abnormal fault of a battery according to an embodiment.

Referring to FIGS. 7 and 8, in a method for detecting an abnormal fault according to an embodiment, a difference between cell data measured at predetermined time intervals in a plurality of battery cells may be mapped on a two-dimensional plane, to generate two-dimensional input data 400 and 410. The two-dimensional plane may include a first axis corresponding to a period of time in which cell data may be measured, and a second axis corresponding to indices allocated to the plurality of battery cells, to identify the plurality of battery cells.

First, referring to FIG. 7, the two-dimensional input data 400 may be image data mapped to the two-dimensional plane. For example, the two-dimensional input data 400 having an image data format may be generated by mapping raw data, as described above with reference to FIG. 6, to form a heat map on the two-dimensional plane. The two-dimensional input data 400 may include a plurality of pixels arranged on the first axis and the second axis on the two-dimensional plane, and a pixel value of each of the plurality of pixels may be a difference between cell data measured at time intervals in the plurality of battery cells.

For example, in the embodiment illustrated in FIG. 7, pixel data of pixels arranged in a first column may be determined according to cell data collected from the plurality of battery cells at a first time point, when measurement of the cell data starts. Since there is no other cell data collected before the first time point, a difference between the cell data collected at the first time point may be all set to 0. Therefore, the pixel data of the pixels arranged in the first column may also be set as first pixel data, which is a basic value.

Pixel data of pixels arranged in a second column may correspond to a difference between cell data collected from the plurality of battery cells at a second time point and the cell data collected from the plurality of battery cells at the first time point. Therefore, the pixel data of the pixels arranged in the second column may appear differently according to characteristics of each of the plurality of battery cells. For example, as the difference between the cell data collected at the first time point and the cell data collected at the second time point increases, the pixel data may increase, and brightness of a pixel corresponding thereto may decrease. A difference in cell data may not necessarily be expressed as the brightness of the pixel, and for example, the two-dimensional input data 400 may be generated by matching colors that may be expressed by each pixel with the difference in cell data.

In the embodiment illustrated in FIG. 7, pixels arranged on a first row may include a difference in cell data measured at predetermined time intervals in a first battery cell, as pixel data. Similarly, pixel data of pixels arranged on a second row may correspond to a difference in cell data measured at the same time interval in a second battery cell. Referring to FIG. 7, in the first battery cell and the second battery cell, a difference in cell data may appear in different manners as a function of time.

The two-dimensional input data 410 according to an embodiment illustrated in FIG. 8 may be data generated using raw data different from the two-dimensional input data 400 according to an embodiment illustrated in FIG. 7. Referring to FIGS. 7 and 8 together, a difference in cell data of battery cells as a function of time may be greater in an embodiment illustrated in FIG. 8, compared to in an embodiment illustrated in FIG. 7.

An abnormal fault detection model according to an embodiment may receive two-dimensional input data 400 and 410 representing a difference in cell data as a function of time. For example, a difference in cell voltage as an image data format can be used to determine whether a battery cell determined to have entered an abnormal state is present. For example, the two-dimensional input data 410 according to an embodiment illustrated in FIG. 8 may be input to a first abnormal fault detection model that includes a convolutional neural network model. The first abnormal fault detection model may determine a battery cell in which a deviation of cell data is determined not to be within a normal range, in the two-dimensional input data 410. For example, the first abnormal fault detection model may determine that a first battery cell has entered the abnormal state, using the two-dimensional input data 410.

Since the two-dimensional input data 410 may be data processed using cell data such as a cell voltage, a cell current, or the like, measured by sensors connected to the plurality of battery cells, a deviation of cell data may be measured as being outside of a normal state by an abnormal fault in the sensor connected to the battery cell, in addition to an abnormal fault in the battery cell itself. Therefore, the abnormal fault detection model according to an embodiment may further include a second abnormal fault detection model using an output of the first abnormal fault detection model to determine an error of a sensor, whether an abnormal cell is present.

With regard to a battery cell in which a deviation of cell data is determined to be outside of a normal state by the first abnormal fault detection model, the second abnormal fault detection model may check a connection error between the battery cell and a sensor, a connection error between the battery cell and a battery management system, or the like. For example, the second abnormal fault detection model may control the battery management system to send a predetermined control command to a battery cell in which a deviation of cell data is determined to be outside of a normal range, and to receive response data from the battery cell.

When the battery management system does not normally receive response data or determines that a failure has occurred in a communication state or the like of battery cells based on the response data, the second abnormal fault detection model may determine that a communication error between the battery cell and the battery management system, and/or an error of a sensor connected to the battery cell, or the like has occurred, rather than an abnormal fault in the battery cell itself. When the battery management system normally receives response data and determines that there is no problem in a communication state based on the response data, the second abnormal fault detection model may determine that an abnormal fault has occurred in a battery cell corresponding thereto itself. In this case, the second abnormal fault detection model may determine an index, which may be identification information of the battery cell corresponding thereto, and may notify a manager or an owner of an electric vehicle/energy storage device equipped with a battery system of occurrence of the abnormal cell.

Figure 9:
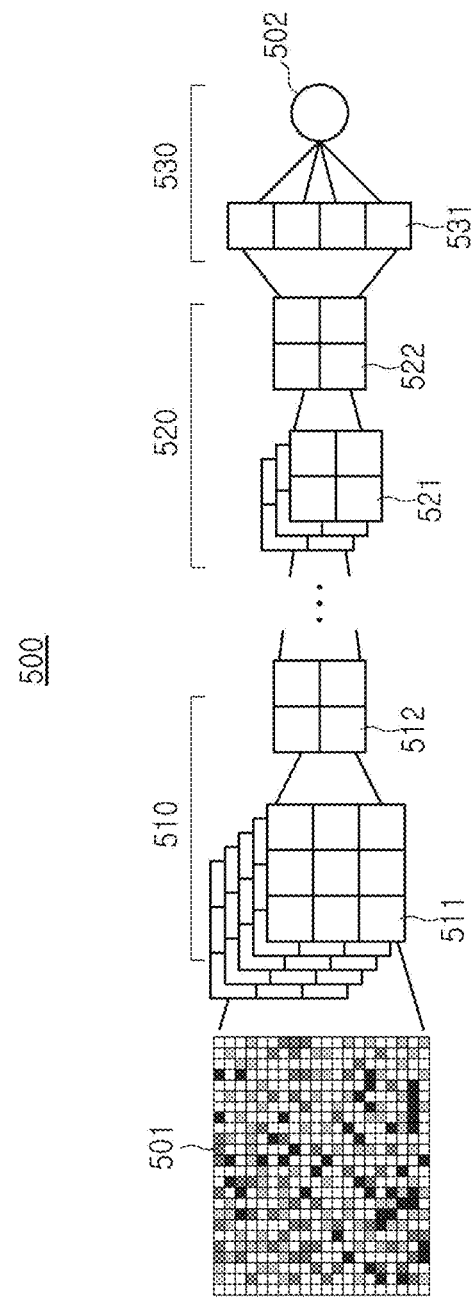
FIG. 9 is a diagram illustrating an abnormal fault detection model used in a method for detecting an abnormal fault of a battery, according to an embodiment.

FIG. 9 is a diagram illustrating an abnormal fault detection model used in a method for detecting an abnormal fault of a battery, according to an embodiment.

Referring to FIG. 9, a first abnormal fault detection model 500 applied to a method for detecting an abnormal fault, according to an embodiment, may include a convolutional neural network. The convolutional neural network may include one or more convolutional layers and a general artificial neural network layer, and may perform pre-processing in the convolutional layers.

In the example shown in FIG. 9, the first abnormal fault detection model 500 includes a plurality of convolutional layers 510 and 520, and a fully connected layers 530 that processes outputs of the convolutional layers 510 and 520. According to embodiments, the first abnormal fault detection model 500 may be implemented as a machine learning model having a structure in which a convolutional neural network model and an auto-encoder are combined. In this case, the fully connected layer 530 may be omitted, and unlike the convolutional layers 510 and 520 functioning as an encoder, deconvolutional layers functioning as a decoder may be replaced with the fully connected layer 530.

Each of the convolutional layers 510 and 520 may include convolution modules 511 and 521, and sub-sampling modules 512 and 522. The convolution modules 511 and 521 may apply one or more kernels to an input feature map, to execute a convolution operation, and may apply an activation function such as ReLU or the like to a result of the convolution operation, to convert values of the feature map into non-linear values. The sub-sampling modules 512 and 522 may perform sub-sampling to reduce a size of the feature map output by the convolution modules 511 and 521. The sub-sampling modules 512 and 522 may also be defined as a pooling module, and may perform, for example, an operation such as max pooling selecting a maximum value from the feature map, average pooling calculating an average from the values of the feature map, or the like.

Input image data 501 input to the convolutional layers 510 and 520 may be two-dimensional input data generated by mapping a deviation of cell data measured for a predetermined period of time in a plurality of battery cells on a two-dimensional plane. As described above, pixel data of respective pixels included in the input image data 501 may be a deviation between cell data measured at a specific time in each of the plurality of data cells and cell data measured at a previous time in each of the plurality of data cells. An output value output by the first abnormal fault detection model 500 may be an index of a battery cell, determined that a deviation of cell data measured for a predetermined period of time is outside of a normal range.

As described above, the index of the battery cell output by the first abnormal fault detection model 500 may be transferred to a second abnormal fault detection model. The second abnormal fault detection model may determine whether a deviation of cell data of a battery cell corresponding to the index received from the first abnormal fault detection model 500 depends on a sensor error, poor communication, or the like, to determine whether the battery cell enters an actual abnormal state.

For example, when an abnormal fault actually occurs in a battery cell, a deviation of cell voltage measured from the battery cell may be greatly changed in a specific SOC section. The second abnormal fault detection model may use this characteristic to determine whether an abnormal fault has actually occurred in a battery cell corresponding to the index received from the first abnormal fault detection model 500.

Figure 10:
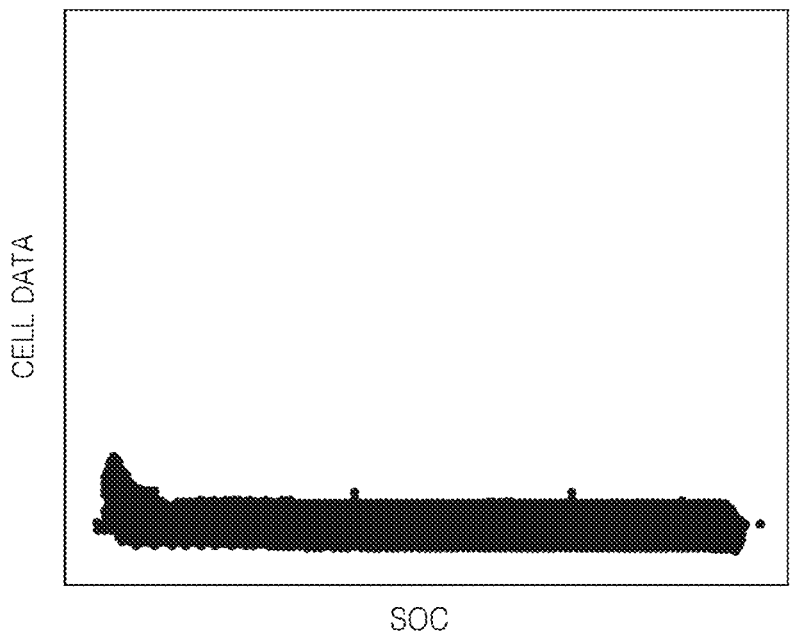
FIGS. 10 to 12 are diagrams illustrating a method for detecting an abnormal fault of a battery, according to an embodiment.
Figure 11:
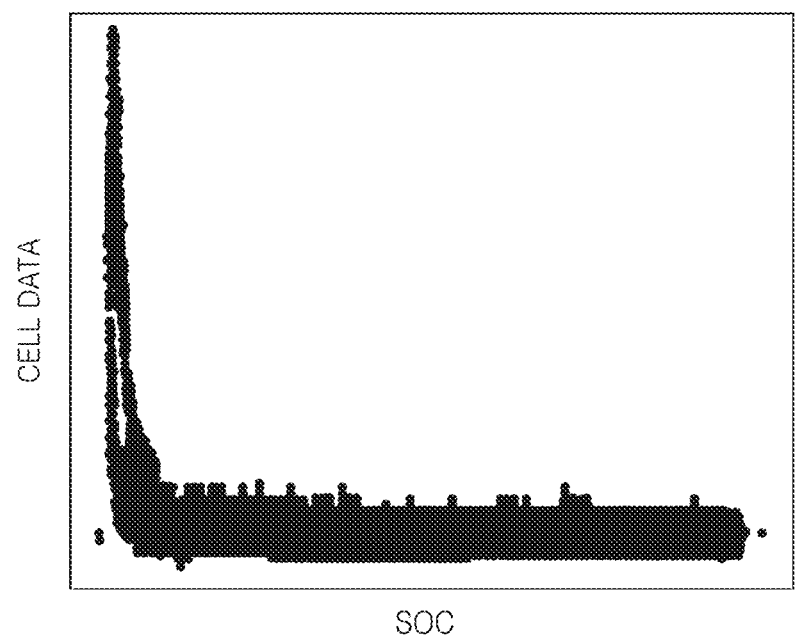
Figure 12:
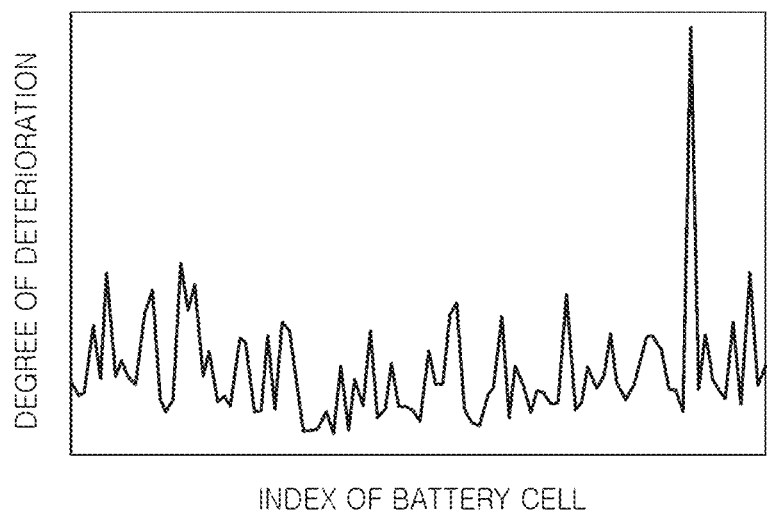

FIGS. 10 to 12 are graphs associated with a method for detecting an abnormal fault of a battery, according to an embodiment.

FIGS. 10 and 11 are graphs illustrating a deviation of cell data measured in respective battery cells included in a battery pack or a battery module, according to SOC. For example, in the embodiment illustrated in FIGS. 10 and 11, cell data measured from battery cells may be a cell voltage. Hereinafter, in embodiments described with reference to FIGS. 10 and 11 for convenience of description, cell data may be measured for one hundred (100) battery cells, and it will be described in the case that the graph of FIG. 10 is a graph composed of cell data measured from a first battery cell, and the graph of FIG. 11 is a graph composed of cell data measured from an $86^{th}$ battery cell.

For example, the first battery cell may be a battery cell normally operating without occurrence of an abnormal state.

Therefore, as illustrated in FIG. 10, a deviation of cell voltage may appear evenly without significant change in most SOC sections. The 86$^{th}$ battery cell may be a battery cell in which deterioration has progressed relatively more as compared to the first battery cell. Therefore, as illustrated in FIG. 11, in some sections in which SOC is small, a deviation of cell voltage may be relatively large, compared to other sections.

A second abnormal fault detection model may set a predetermined reference range, and may determine a battery cell in which a deviation of cell voltage is outside of the reference range, for example, a second battery cell, as an abnormal cell. Alternatively, the abnormal cell may be determined by using a correlation between deviations of cell voltages measured in each of the battery cells, without setting one reference range.

In embodiments illustrated in FIGS. 10 and 11, a deviation of cell voltage appearing in the second battery cell may have a low correlation with a deviation of cell voltage of other battery cells, compared to a deviation of cell voltage appearing in the first battery cell. For example, in an embodiment, the second abnormal fault detection model may determine whether each of the battery cells is an abnormal cell, using a correlation coefficient indicating a correlation.

For example, when a specific battery cell among the battery cells deteriorates, resistance of the battery cell may increase. As a result, a voltage deviation collected from the battery cell may appear larger than a voltage deviation collected from the other cell, in a section having a high SOC and/or a section having a low SOC. A battery cell that has deteriorated may be highly likely to have different changes in voltage, compared to other battery cells, and through this, a correlation coefficient, which may be an index for determining whether deterioration of each of the battery cells has occurred, may be defined.

For example, when a voltage deviation in a specific battery cell and a voltage deviation in other battery cells are significantly different, a correlation coefficient indicating a correlation between voltage deviations measured in each of the battery cells may decrease. Therefore, a degree of deterioration of each of the battery cells may be determined by comparing a representative value, for example, a median value or an average value, of the correlation coefficient obtained from all the battery cells with the correlation coefficient obtained between each of the battery cells and other battery cells. In other words, a degree of deterioration of a battery cell can be determined to be high, when a difference between a correlation coefficient obtained between the battery cell and other battery cells, and the representative value of the correlation coefficient obtained from all the battery cells increases.

FIG. 12 is a graph illustrating a degree of deterioration of each of the battery cells calculated based on the correlation coefficient, as described above. In FIG. 12, a horizontal axis may be an index, which may be identification information of battery cells, and a vertical axis may be a degree of deterioration of each of the battery cells determined using the correlation coefficient. As illustrated in FIG. 12, the degree of deterioration of the 86$^{th}$ battery cell, which appears at an 86$^{th}$ position along the horizontal axis, may be relatively greater than that of other battery cells. Therefore, the second abnormal fault detection model may determine that the 86$^{th}$ battery cell among the one hundred (100) battery cells is an abnormal cell, and notify a user of this.

A method for detecting an abnormal fault of a battery, according to an embodiment, may collect cell data from a plurality of battery cells for a predetermined period of time, may calculate a deviation of the cell data for during every predetermined time interval, and may map the cell data on a two-dimensional plane, to generate two-dimensional input data having an image data format. A battery system mounted on an electric vehicle, an energy storage device, or the like may be stably managed and operated by using two-dimensional input data to specify a battery cell in which a deviation of cell data is outside of a normal range, determining an error of a sensor occurring in the specified battery cell, and/or a degree of deterioration of the cell, to notify the same to a user.

The disclosed technology can be implemented in rechargeable secondary batteries that are widely used in battery-powered devices or systems, including, e.g., digital cameras, mobile phones, notebook computers, hybrid vehicles, electric vehicles, uninterruptible power supplies, battery storage power stations, and others including battery power storage for solar panels, wind power generators and other green tech power generators. Specifically, the disclosed technology can be implemented in some embodiments to provide improved electrochemical devices such as a battery used in various power sources and power supplies, thereby mitigating climate changes in connection with uses of power sources and power supplies. Lithium secondary batteries based on the disclosed technology can be used to address various adverse effects such as air pollution and greenhouse emissions by powering electric vehicles (EVs) as alternatives to vehicles using fossil fuel-based engines and by providing battery based energy storage systems (ESSs) to store renewable energy such as solar power and wind power.

While examples of embodiments of the disclosed technology have been illustrated and described above, various modifications and variations to the disclosed embodiments and other embodiments could be made based on what is disclosed in this patent document.

What is claimed is:

1. A method for detecting an abnormal condition or fault of a battery pack including battery cells, comprising:
    measuring, for a predetermined period of time, cell data from the battery cells included in the battery pack;
    generating two-dimensional input data by mapping the cell data on a two-dimensional plane having a first axis corresponding to a time index and a second axis corresponding to an index of each of the battery cells, wherein the index of each battery cell provides identification information to identify a corresponding battery cell;
    inputting the two-dimensional input data into an abnormal fault detection model pre-trained to detect an abnormal fault in the battery pack; and
    determining whether an abnormal cell, having entered an abnormal state, among the battery cells, is present, based on an output of the abnormal fault detection model,
    wherein the abnormal fault detection model comprises a first abnormal fault detection model configured to receive the two-dimensional input data and output a data deviation of the cell data, measured in each of the battery cells, and a second abnormal fault detection model configured to determine whether an abnormal fault of at least one sensor connected to the battery cells occurs, and whether the abnormal cell is present, based on an output of the first abnormal fault detection model.

2. The method of claim 1, wherein the cell data comprises a cell voltage deviation between cell voltages measured in the battery cells, a cell current deviation between cell currents measured in the battery cells, a temperature deviation measured in the battery cells, or a combination thereof.

3. The method of claim 1, wherein the two-dimensional input data is generated by mapping the cell data to the two-dimensional plane to form a heat map.

4. The method of claim 1, wherein whether the abnormal fault has occurred, based on output data of each of the first abnormal fault detection model and the second abnormal fault detection model, is output to a user of a system in which the battery pack is mounted.

5. The method of claim 4, wherein the system in which the battery pack is part of an electric vehicle or an energy storage device.

6. The method of claim 1, wherein the second abnormal fault detection model generates a distribution of the data deviation output by the first abnormal fault detection model for the battery cells in a predetermined state-of-charge (SOC) section, and determines whether the abnormal cell is present, based on the distribution.

7. The method of claim 6, wherein the second abnormal fault detection model determines a battery cell having the data deviation out of a predetermined reference range in the distribution, among the battery cells, as the abnormal cell, and outputs an index of the abnormal cell.

8. The method of claim 1, wherein the first abnormal fault detection model comprises a convolutional neural network (CNN) model.

9. The method of claim 1, wherein the second abnormal fault detection model uses a ratio of a correlation between one battery cell and respective remaining battery cells, selected from among the battery cells, and a correlation between the respective remaining battery cells, to determine whether the one battery cell is the abnormal cell.

10. The method of claim 1, wherein the abnormal fault detection model further comprises a third abnormal fault detection model configured to detect a change in temperature of the battery pack in charging the battery pack, to determine whether the abnormal cell is present.

11. A battery management system comprising:
an input data generator configured to receive cell data from at least a portion of a plurality of battery cells for a predetermined period of time, and map the cell data on a two-dimensional plane, to generate two-dimensional input data, wherein the two-dimensional plane has a first axis corresponding to a time index and a second axis corresponding to an index of each of the plurality of battery cells, wherein the index of each battery cell provides identification information to identify a corresponding battery cell;
a detection model configured to receive the two-dimensional input data from the input data generator and operable to identify at least one battery cell having a deviation of the cell data outside of a normal range, among the plurality of battery cells, based on the two-dimensional input data; and
an abnormal fault determiner configured to receive information from the detection model with respect to identification of the at least one battery cell having the deviation of the cell data outside of the normal range and process the information to determine whether the at least one battery cell exhibits an abnormal condition,
wherein the detection model comprises a first detection model configured to receive the two-dimensional input data to identify the at least one battery cell, and a second detection model configured to determine whether the at least one battery cell is an abnormal cell, and whether an error of a sensor connected to the at least one battery cell is present.

12. The battery management system of claim 11, wherein the first axis spans the predetermined period of time, and wherein the input data generator is configured to map the cell data on the two-dimensional plane to form the two-dimensional input data as an image data format.

13. The battery management system of claim 12, wherein the two-dimensional input data comprises a plurality of pixels, and pixel data of each of the plurality of pixels corresponds to the deviation of the cell data appearing at predetermined time intervals in each of the plurality of battery cells.

14. A method for managing a battery, executed in a system including a battery management system and a server connected to the battery management system through a communication network, the method comprising:
receiving, by the server, cell data collected from the battery by the battery management system for a predetermined period of time;
generating two-dimensional input data by mapping the cell data on a two-dimensional plane having a first axis corresponding to the predetermined period of time and a second axis corresponding to indices of battery cells included in the battery, wherein an index of each battery cell provides identification information to identify a corresponding battery cell;
inputting the two-dimensional input data into an abnormal fault detection model pre-trained to detect an abnormal fault in the battery and stored in the server;
determining whether an abnormal cell, having entered an abnormal state, among the battery cells, is present, based on an output of the abnormal fault detection model; and
transmitting information on the abnormal cell to a user terminal connected to the communication network, the battery management system, or both the user terminal and the battery management system,
wherein the server stores a first abnormal fault detection model configured to receive the two-dimensional input data and output a data deviation of the cell data, measured in each of the battery cells, and a second abnormal fault detection model configured to determine whether an abnormal fault of at least one sensor connected to the battery cells occurs, and whether the abnormal cell is present, based on an output of the first abnormal fault detection model.

15. The method of claim 14, wherein the server transmits an indication of whether an abnormal fault in the system comprising the battery has occurred, based on output data of each of the first abnormal fault detection model and the second abnormal fault detection model, to the user terminal, the battery management system, or both the user terminal and the battery management system.

16. The method of claim 14, wherein the battery and the battery management system are included in an electric vehicle, wherein the server is connected to a plurality of electric vehicles through the communication network,
and wherein the server classifies the plurality of electric vehicles into a plurality of groups, based on a production year or a cumulative mileage of each of the plurality of electric vehicles, a lifespan state of the battery, or a combination thereof.

17. The method of claim 16, wherein the server compares the cell data obtained from the plurality of electric vehicles included in each of the plurality of groups with each other, to determine a median value and a reference range from the median value, and provides a maintenance notification service to an electric vehicle transmitting cell data outside of the reference range, among the plurality of electric vehicles, through the communication network.

* * * * *